US012675271B2

(12) United States Patent
Li et al.

(10) Patent No.: US 12,675,271 B2
(45) Date of Patent: Jul. 7, 2026

(54) CODE EXECUTION METHOD AND DEVICE

(71) Applicant: Huawei Cloud Computing Technologies Co., Ltd., Guizhou (CN)

(72) Inventors: Fei Li, Beijing (CN); Chang Liu, Gui'an (CN)

(73) Assignee: HUAWEI CLOUD COMPUTING TECHNOLOGIES CO., LTD., Guizhou (CN)

(*) Notice: Subject to any disclaimer, the term of this patent is extended or adjusted under 35 U.S.C. 154(b) by 663 days.

(21) Appl. No.: 17/973,889

(22) Filed: Oct. 26, 2022

(65) Prior Publication Data

US 2023/0037753 A1 Feb. 9, 2023

Related U.S. Application Data

(63) Continuation of application No. PCT/CN2021/086711, filed on Apr. 12, 2021.

(30) Foreign Application Priority Data

Apr. 26, 2020 (CN) .......................... 202010337776.8

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC ...................................... G06F 8/65; G06F 8/71
See application file for complete search history.

(56) References Cited

U.S. PATENT DOCUMENTS

| | | | | |
|---|---|---|---|---|
| 9,244,679 | B1 * | 1/2016 | Arellano | .................... G06F 8/71 |
| 9,389,851 | B1 * | 7/2016 | Nelson | ..................... G06F 16/27 |
| 9,922,135 | B1 * | 3/2018 | Noble | ................... G06F 16/182 |
| 10,599,571 | B2 * | 3/2020 | Porpodas | .................. G06F 8/41 |
| 11,546,341 | B2 * | 1/2023 | Fuhry | ................... G06F 21/602 |

(Continued)

FOREIGN PATENT DOCUMENTS

| | | |
|---|---|---|
| CN | 103745158 A | 4/2014 |
| CN | 108701018 A | 10/2018 |
| CN | 110096272 A * | 8/2019 |

OTHER PUBLICATIONS

Anonymous: "Git-What is Git?", URL:https://web.archive .org/web/20200109002159/https://git-scm.com/book/en/v2/Getting-Started-What-is-Git?, Jan. 9, 2020, XP093074837, 4 pages.

*Primary Examiner* — Lewis A Bullock, Jr.
*Assistant Examiner* — Theodore E Hebert
(74) *Attorney, Agent, or Firm* — Conley Rose, P.C.

(57) ABSTRACT

A code execution method includes: a pre-preparation service module obtaining a pre-preparation policy set by a user; the pre-preparation service module downloading, based on the pre-preparation policy, an updated code file included in an updated code version from a code hosting platform to a storage cluster; the pre-preparation service module receiving a code execution request; the pre-preparation service module determining a storage address of code content corresponding to the code execution request in the storage cluster and sending the storage address to an executor; the executor obtaining the code content based on the received storage address and executing the obtained code content.

20 Claims, 5 Drawing Sheets

(56)          References Cited

U.S. PATENT DOCUMENTS

| 2014/0181789 A1* | 6/2014 | Canter ...................... G06F 8/34 |
| | | 717/113 |
| 2014/0289426 A1* | 9/2014 | Chan ...................... H04L 67/10 |
| | | 709/247 |
| 2016/0085838 A1* | 3/2016 | Cho ........................ G06F 16/27 |
| | | 707/638 |
| 2016/0092526 A1* | 3/2016 | Kothari ................ G06F 16/182 |
| | | 707/602 |
| 2016/0224327 A1* | 8/2016 | Angelotti ........... G06F 9/44521 |
| 2017/0185573 A1* | 6/2017 | Milvaney ........... H04L 67/1097 |
| 2017/0337052 A1* | 11/2017 | Elkabany ................. G06F 8/71 |
| 2018/0084086 A1* | 3/2018 | Newman ................ H04L 67/02 |
| 2018/0357051 A1* | 12/2018 | Puszkiewicz ....... G06F 9/45512 |
| 2019/0042433 A1* | 2/2019 | Porpodas .............. G06F 8/4442 |
| 2020/0104171 A1* | 4/2020 | Theimer ................ G06F 16/183 |
| 2020/0285462 A1* | 9/2020 | Sabath ...................... G06F 8/33 |
| 2021/0029108 A1* | 1/2021 | Obando Chacon ... G06F 21/604 |
| 2023/0037753 A1* | 2/2023 | Li ............................. G06F 8/65 |

* cited by examiner

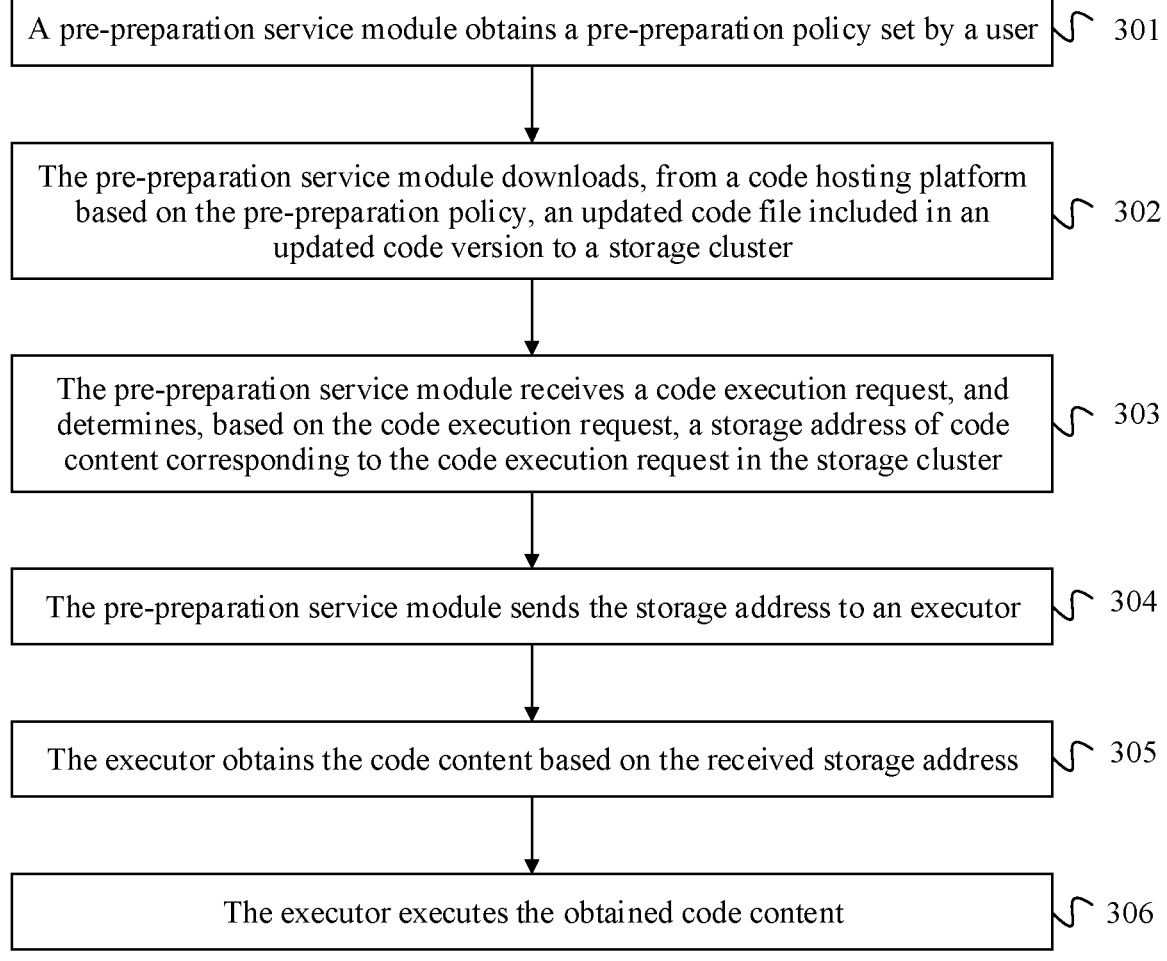

A pre-preparation service module obtains a pre-preparation policy set by a user — 301

The pre-preparation service module downloads, from a code hosting platform based on the pre-preparation policy, an updated code file included in an updated code version to a storage cluster — 302

The pre-preparation service module receives a code execution request, and determines, based on the code execution request, a storage address of code content corresponding to the code execution request in the storage cluster — 303

The pre-preparation service module sends the storage address to an executor — 304

The executor obtains the code content based on the received storage address — 305

The executor executes the obtained code content — 306

FIG. 3

| Select a code version to be used in this compilation and building | |
| --- | --- |
| ☑ 4358ca2e | Fix# code result rectification |
| ☐ 17bfab15 | Merge remote-tracking branch 'origin/master' |
| ☐ 1405fe59 | Fix# write project_policy.rb |
| ☐ f4d598e2 | Merge remote-tracking branch 'origin/master' Conflicts |
| ☐ 04ad141a | Fix# path and mrurl |
| ☐ d32df9a5 | checkCustomAction update |
| ☐ a62d4147 | Fix# fix an issue where the package is incorrectly imported |
| ☐ 26080ebb | Fix# compile the second half of the post_receive interface and optimize the discover interface |

FIG. 6

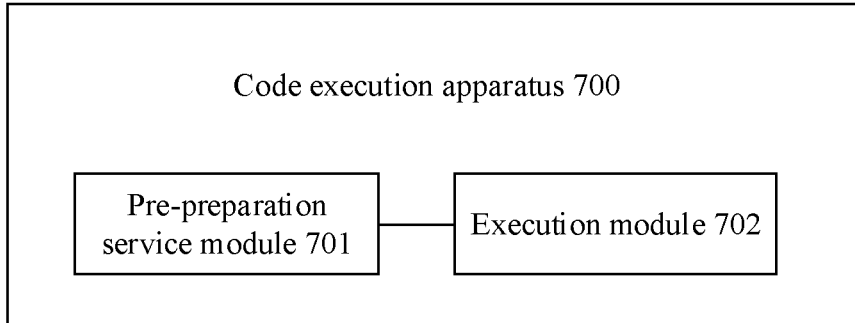

FIG. 7

CODE EXECUTION METHOD AND DEVICE

CROSS-REFERENCE TO RELATED APPLICATIONS

This is a continuation of International Patent Application No. PCT/CN2021/086711 filed on Apr. 12, 2021, which claims priority to Chinese Patent Application No. 202010337776.8 filed on Apr. 26, 2020. The disclosures of all of the aforementioned patent applications are hereby incorporated by reference in their entireties.

TECHNICAL FIELD

This application relates to the field of software development technologies, and in particular, to a code execution method and a device.

BACKGROUND

Tools such as compilation and building and code check are indispensable during software package creation. These tools are executed and operated based on a specific version of code. To use these tools, the code of the specific version needs to be obtained. The obtaining process has a critical impact on execution efficiency of these tools.

In the conventional technology, a user selects, in a compilation and building system, a code version on which compilation and building are to be performed. A download machine in the compilation and building system downloads corresponding code from a code version control system based on the code version selected by the user, and then distributes the downloaded code to each executor based on a dependency relationship, so that each executor can complete a compilation and execution operation.

However, for some relatively large software products, hundreds or thousands of executors may be required to simultaneously initiate download actions from a code hosting platform. Therefore, a download process may take a relatively long time, and compilation and building completion efficiency may be low.

SUMMARY

This application provides a code execution method and a device, to improve efficiency of completing a code processing process such as compilation and building, code check, and code analysis.

According to a first aspect, this application provides a code execution method, and the method is applied to a code execution system. The code execution system includes a pre-preparation service module, a storage cluster, and an executor. The method includes: the pre-preparation service module obtains a pre-preparation policy set by a user; the pre-preparation service module downloads, based on the pre-preparation policy, an updated code file included in an updated code version from a code hosting platform to the storage cluster; the pre-preparation service module receives a code execution request, and determines, based on the code execution request, a storage address of code content corresponding to the code execution request in the storage cluster; the pre-preparation service module sends the storage address to the executor; the executor obtains the code content based on the received storage address; and the executor executes the obtained code content.

In a possible design, that the pre-preparation service module downloads, based on the pre-preparation policy, an updated code file included in an updated code version from a code hosting platform to the storage cluster includes: the pre-preparation service module receives a code version update notification sent by the code hosting platform; the pre-preparation service module determines, based on the code version update notification and the pre-preparation policy, whether the updated code version complies with the pre-preparation policy; and if the updated code version complies with the pre-preparation policy, the pre-preparation service module downloads the updated code file included in the updated code version from the code hosting platform to the storage cluster.

In a possible design, the pre-preparation policy includes a first commit type, and the code version update notification includes a commit type corresponding to the updated code version.

That the pre-preparation service determines, based on the code version update notification and the pre-preparation policy, whether the updated code version complies with the pre-preparation policy includes: determining, based on the commit type corresponding to the updated code version, whether the commit type corresponding to the updated code version and the first commit type are a same commit type; and if the commit type corresponding to the updated code version and the first commit type are a same commit type, determining that the updated code version complies with the pre-preparation policy.

In a possible design, the pre-preparation policy includes a first code branch, and the code version update notification includes information about a code branch in which the updated code version is located.

That the pre-preparation service determines, based on the code version update notification and the pre-preparation policy, whether the updated code version complies with the pre-preparation policy includes: determining, based on the information about the code branch in which the updated code version is located, whether the code branch in which the updated code version is located and the first code branch are a same code branch; and if the code branch in which the updated code version is located and the first code branch are a same code branch, determining that the updated code version complies with the pre-preparation policy.

In a possible design, the code version update notification further includes an identifier of the updated code version, and the method further includes: the pre-preparation service module determines, based on the identifier of the updated code version, M code files corresponding to the updated code version, where M is a positive integer; the pre-preparation service module obtains a storage address of code content of each code file in the M code files in the storage cluster; and the pre-preparation service module generates, based on the identifier of the updated code version, the M code files, and the storage address of the code content of each code file in the M code files in the storage cluster, a file tree object corresponding to the updated code version.

In a possible design, the code execution request carries information about at least one code version that the user requests to execute.

That the pre-preparation service module determines, based on the code execution request, a storage address of code content corresponding to the code execution request in the storage cluster includes: the pre-preparation service module determines, based on the information about the at least one code version and the file tree object, a storage address of code content corresponding to each code version in the at least one code version.

That the executor obtains the code content based on the received storage address includes: the executor determines to-be-read storage addresses based on the received storage address of the code content corresponding to each code version in the at least one code version, where storage addresses included in the to-be-read storage addresses are different from each other; and the executor reads the code content from the storage cluster based on the to-be-read storage addresses.

According to a second aspect, this application provides a code execution apparatus, including: a pre-preparation service module, configured to: obtain a pre-preparation policy set by a user; download, based on the pre-preparation policy, an updated code file included in an updated code version from a code hosting platform to a storage cluster; receive a code execution request, and determine, based on the code execution request, a storage address of code content corresponding to the code execution request in the storage cluster; and send the storage address to an executor; and an execution module, configured to: obtain the code content based on the received storage address; and execute the obtained code content.

In a possible design, the pre-preparing service module is specifically configured to: receive a code version update notification sent by the code hosting platform; determine, based on the code version update notification and the pre-preparation policy, whether the updated code version complies with the pre-preparation policy; and if the updated code version complies with the pre-preparation policy, download the updated code file included in the updated code version from the code hosting platform to the storage cluster.

In a possible design, the pre-preparation policy includes a first commit type, and the code version update notification includes a commit type corresponding to the updated code version; and the pre-preparation service module is specifically configured to: determine, based on the commit type corresponding to the updated code version, whether the commit type corresponding to the updated code version and the first commit type are a same commit type; and if the commit type corresponding to the updated code version and the first commit type are a same commit type, determine that the updated code version complies with the pre-preparation policy.

In a possible design, the pre-preparation policy includes a first code branch, and the code version update notification includes information about a code branch in which the updated code version is located; and the pre-preparation service module is specifically configured to: determine, based on the information about the code branch in which the updated code version is located, whether the code branch in which the updated code version is located and the first code branch are a same code branch; and if the code branch in which the updated code version is located and the first code branch are a same code branch, determine that the updated code version complies with the pre-preparation policy.

In a possible design, the pre-preparation service module is further configured to: determine, based on an identifier of the updated code version, M code files corresponding to the updated code version, where M is a positive integer; obtain a storage address of code content of each code file in the M code files in the storage cluster; and generate, based on the identifier of the updated code version, the M code files, and the storage address of the code content of each code file in the M code files in the storage cluster, a file tree object corresponding to the updated code version.

In a possible design, the code execution request carries information about at least one code version that the user requests to execute; and the pre-preparation service module is specifically configured to: determine, based on the information about the at least one code version and the file tree object, a storage address of code content corresponding to each code version in the at least one code version; and correspondingly, the execution module is specifically configured to: determine to-be-read storage addresses based on the received storage address of the code content corresponding to each code version in the at least one code version, where storage addresses included in the to-be-read storage addresses are different from each other; and read the code content from the storage cluster based on the to-be-read storage addresses.

According to a third aspect, this application provides a readable storage medium. The readable storage medium stores a computer program. When the computer program is executed, the foregoing code execution method is implemented.

According to a fourth aspect, this application provides an electronic device, including a memory and a processor.

The memory is configured to store program instructions, and the processor is configured to invoke the program instructions in the memory to perform the foregoing code execution method.

According to the code execution method and the device provided in this embodiment, a user is allowed to set a pre-preparation policy. A pre-preparation service module may obtain, in advance based on the pre-preparation policy, a code version that complies with the policy and store the code version in a storage cluster. When the user triggers a code execution request, code content can be directly obtained from the storage cluster. In this way, a problem of low compilation and building completion efficiency caused by a relatively long time occupied by a download action can be avoided. In addition, after receiving a plurality of storage addresses, an executor filters out duplicate storage addresses, to obtain to-be-read storage addresses. Because storage addresses included in the to-be-read storage addresses are different, a problem of repeated reading can be avoided, and this further resolves a problem in the conventional technology that a code file is repeatedly downloaded when execution tasks received by an executor overlap.

BRIEF DESCRIPTION OF DRAWINGS

FIG. 3 is a schematic flowchart of an embodiment of a code execution method according to this application;

FIG. 6 is a diagram of a user interface according to this application;

FIG. 7 is a schematic diagram of a structure of a code execution apparatus 700 according to this application.

DESCRIPTION OF EMBODIMENTS

To make the objectives, technical solutions, and advantages of this application clearer, the following clearly describes the technical solutions in this application with reference to accompanying drawings in this application. It is clearly that described embodiments are a part rather than all of embodiments of this application. All other embodiments obtained by persons of ordinary skill in the art based on embodiments of this application without creative efforts shall fall within the protection scope of this application.

In this application, it should be explained that terms such as "first" and "second" are merely intended for a purpose of description, and shall not be understood as an indication or implication of relative importance. In addition, "at least one" means one or more, and "a plurality of" means two or more. The term "and/or" describes an association relationship between associated objects and may indicate three relationships. For example, A and/or B may indicate the following cases: Only A exists, both A and B exist, and only B exists. A and B may be singular or plural. The character "/" generally indicates a kind of "or" relationship between the associated objects. "At least one of the following items (pieces)" or a similar expression thereof means any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural.

Figure 1:
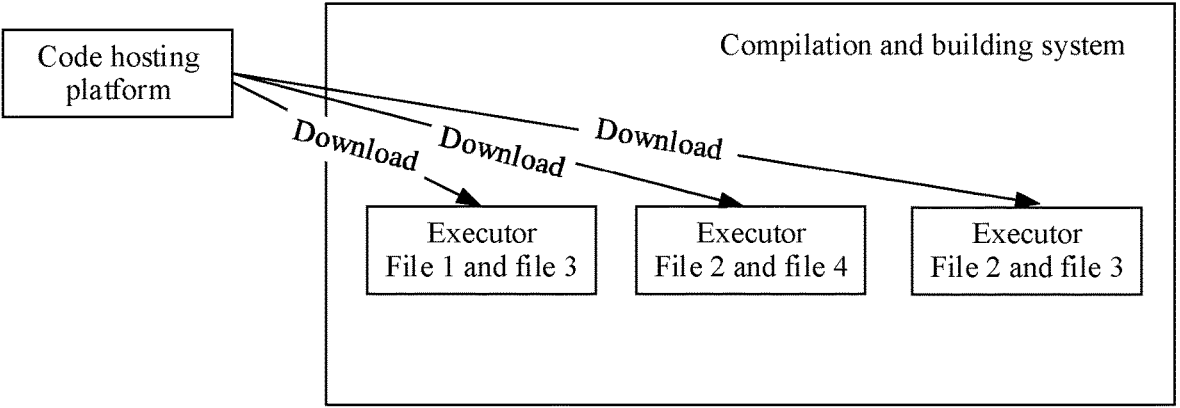
FIG. 1 is a framework diagram of a compilation and building system according to the conventional technology.

For the same software product, many code versions are generated when R&D personnel continuously improve functions and fix vulnerabilities. In a process of creating a software package of a code version, tools such as compilation and building, code check, and code analysis are used. A compilation and building tool is used as an example. As shown in FIG. 1, a compilation and building process in the conventional technology is as follows: A user selects a code version on which compilation and building are to be performed. A distribution module in a compilation and building system determines, based on the code version selected by the user, a plurality of code files corresponding to the code version, and then delivers an execution task to each executor based on a dependency relationship between these code files. After receiving the execution task, the executor first downloads the corresponding code file from a code hosting platform, and then performs a compilation and building operation. For example, if the code version selected by the user is version A, the distribution module may determine that code files corresponding to version A include a file 1, a file 2, a file 3, and a file 4, where the file 1 and the file 3 have a dependency relationship, the file 2 and the file 4 have a dependency relationship, and the file 2 and the file 3 have a dependency relationship. In this case, based on the foregoing dependency relationships, the file 1 and the file 3 may be used as one execution task, the file 2 and the file 4 may be used as one execution task, the file 2 and the file 3 may be used as one execution task, and the three execution tasks may be delivered to the three executors shown in FIG. 1. After receiving the execution tasks, the executors first download the corresponding code files from the code hosting platform, and then perform a compilation and building operation on code content in the downloaded code files.

However, for some relatively large software products, hundreds or thousands of executors may be required to simultaneously initiate download actions from the code hosting platform, and a download process takes a relatively long time, so that compilation and building completion efficiency is low. In addition, when the user needs to build a plurality of code versions, if the execution tasks received by the executor overlap, a code file may be repeatedly downloaded. For example, if a user needs to build a code version A and a code version B, an execution task corresponding to the code version A received by an executor includes a file 1 and a file 2, and an execution task corresponding to the code version B includes the file 1 and a file 3. In this case, the execution tasks received by the executor overlap, and the executor needs to repeatedly download the file 1, and this causes a waste of download resources.

It should be noted that the foregoing description is provided by using a compilation and building tool as an example. A code check tool and a code analysis tool are similar to the compilation and building tool in terms of obtaining a code version, and are both implemented by executors directly downloading code files from a code hosting platform. Therefore, for the two tools, problems similar to those in compilation and building also exist, that is, low code check efficiency and low code analysis efficiency.

Figure 2:
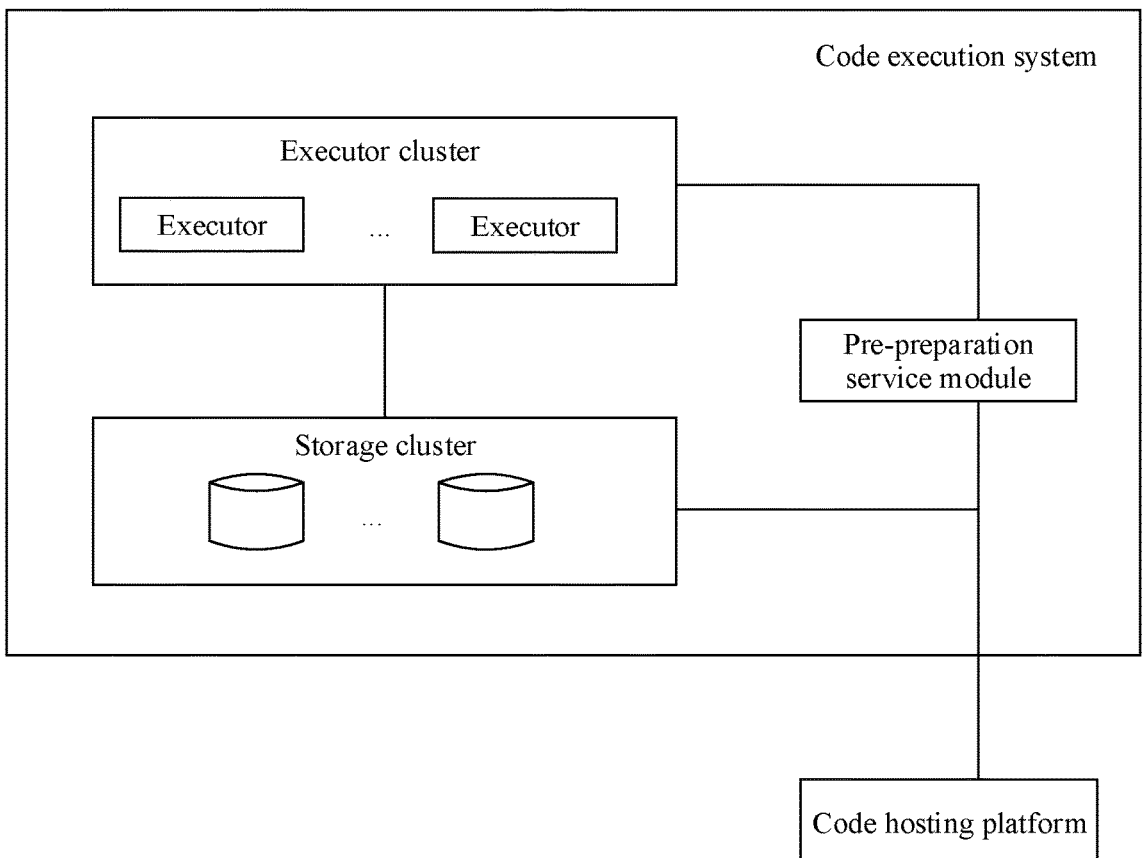
FIG. 2 is a framework diagram of a code execution system according to this application.

Due to the foregoing technical problems in the conventional technology, this application provides a code execution method. The method may be implemented based on a code execution system shown in FIG. 2. The code execution system shown in FIG. 2 includes a pre-preparation service module, a storage cluster, and an executor cluster. The executor cluster includes a plurality of executors. The pre-preparation service module may be integrated in the code execution system, or may be an independent module. FIG. 2 shows an example in which the pre-preparation service module is integrated in the code execution system. A user can configure a pre-preparation policy of a code version by using the pre-preparation service module.

It should be noted that when the code execution method provided in this application is applied to a compilation and building scenario, the code execution system may be a compilation and building system; when the code execution method provided in this application is applied to a code check scenario, the code execution system may be a code check system; or when the code execution method provided in this application is applied to a code analysis scenario, the code execution system may be a code analysis system.

In the conventional technology, it takes a relatively long time for an executor to download a corresponding code file from a code hosting platform, and this results in low compilation and building completion efficiency. In view of this, the foregoing pre-preparation service module is added in this application. A user may configure a pre-preparation policy of a code version by using the pre-preparation service module. When the code version is updated on a code hosting platform, the pre-preparation service module may download, based on the foregoing pre-preparation policy, an updated code file included in an updated code version from the code hosting platform to a storage cluster, so that the storage cluster stores all code versions that comply with the pre-preparation policy set by the user. When the user needs to perform compilation and building on one or more of the code versions, the user triggers a code execution request. After receiving the code execution request, the pre-preparation service module first determines, based on the code execution request, a storage address of code content corresponding to the code execution request in the storage cluster. Then, the storage address is sent to an executor, so that the executor can obtain the code content based on the storage address, and further execute the obtained code content.

It can be learned that the code execution method provided in this application allows a user to set a pre-preparation policy. A pre-preparation service module may obtain, in advance based on the pre-preparation policy, a code version that complies with the policy and store the code version in a storage cluster. When the user triggers a code execution request, code content can be directly obtained from the storage cluster. Therefore, a problem of low compilation and building completion efficiency caused by a relatively long time occupied by a download action can be avoided.

The following describes in detail the code execution method provided in this application by using specific embodiments. Based on the system shown in FIG. 2, FIG. 3 is a schematic flowchart of an embodiment of a code execution method according to this application. As shown in FIG. 3, the code execution method provided in this application includes the following steps.

S301: A pre-preparation service module obtains a pre-preparation policy set by a user.

In a possible implementation, the code execution system shown in FIG. 2 provides a user interaction interface, and the user may configure the pre-preparation policy by using the user interaction interface.

Optionally, the pre-preparation policy may be a code branch, or may be a commit type.

S302: The pre-preparation service module downloads, based on the pre-preparation policy, an updated code file included in an updated code version from a code hosting platform to a storage cluster.

In a possible implementation, this step may further include the following steps.

Step A: The pre-preparation service module receives a code version update notification sent by the code hosting platform.

Specifically, when detecting that there is an updated code version, the code hosting platform sends the code version update notification to the pre-preparation service module. The code version update notification may include: an identifier of the updated code version, information about a code branch in which the updated code version is located, a commit type corresponding to the updated code version, and/or information about the updated code file included in the updated code version.

The following describes the meanings of the code branch, the code version, and the code file on the code hosting platform.

Figures 4, 5:
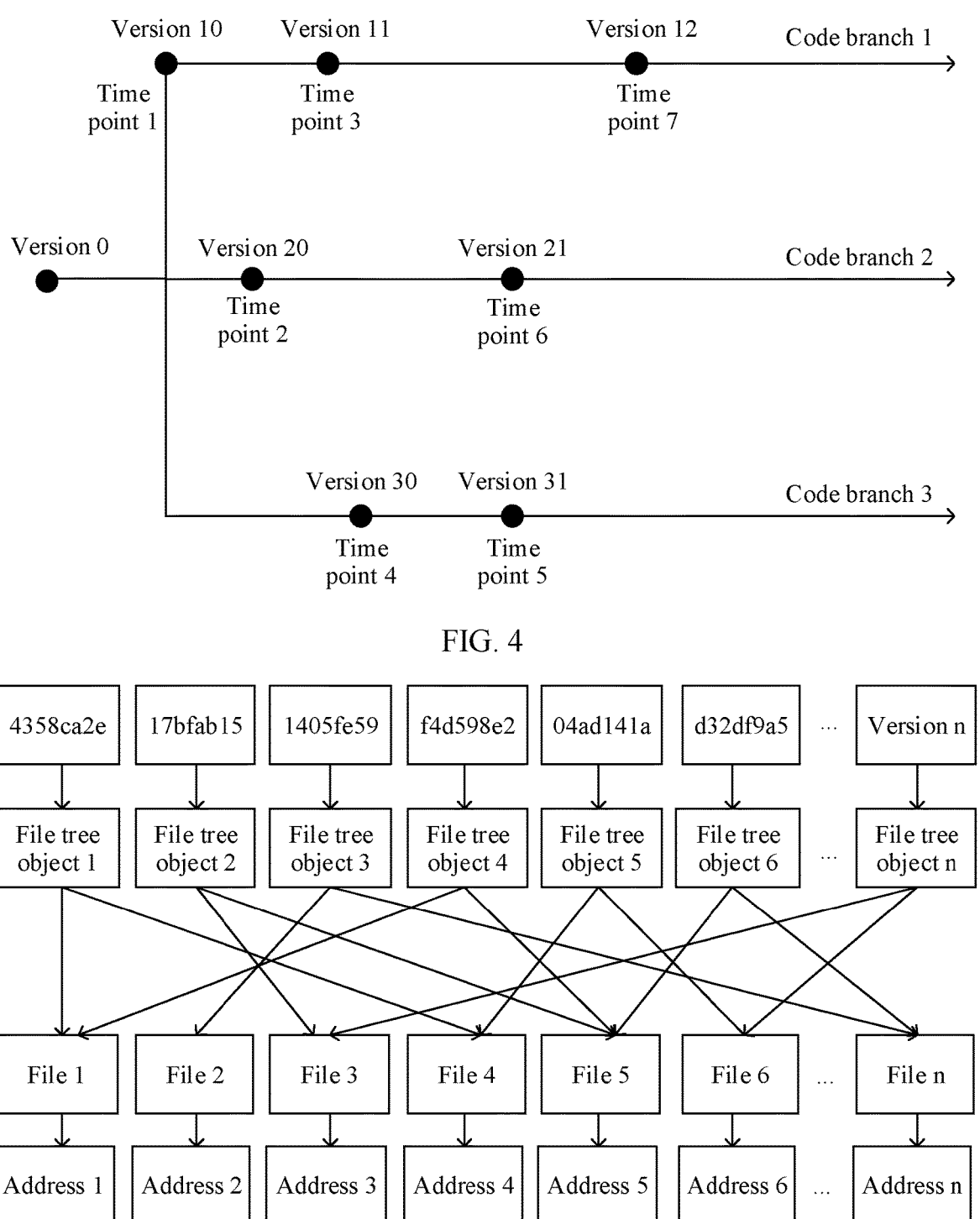
FIG. 4 is a schematic diagram of a code branch according to this application.
FIG. 5 is a schematic diagram of a file tree object according to this application.

As shown in FIG. 4, it is assumed that a basic version of a software product is a version 0. A new code version may be further developed based on the version 0 for purposes such as function optimization and vulnerability fixing of the product. A plurality of code branches may be designed based on different development purposes. R&D personnel may update a code version on a corresponding code branch. Each code version is a version further developed based on a previous code version on a same code branch. The submission of each code version corresponds to a time point. Therefore, each code version also corresponds to a time point. Each code version includes one or more code repositories, and each code repository includes a plurality of code files.

In a possible implementation, when a user submits a new code version, the code hosting platform may determine that there is a code version update, and may use the code version submitted by the user as the updated code version. The code hosting platform may further obtain a modified code file submitted by the user this time, and use the code file as the updated code file included in the updated code version.

For example, it is assumed that a user modifies a file 110 included in a version 11 on a code branch 1, to obtain a file 120, and after the file 120 is submitted, a version 12 is obtained. The code hosting platform may use the version 12 as an updated code version. The file 120 may be used as the updated code file included in the version 12.

Step B: The pre-preparation service module determines, based on the code version update notification and the pre-preparation policy, whether the updated code version complies with the pre-preparation policy.

In a possible implementation, the pre-preparation policy set by the user includes a first commit type. In this case, whether the updated code version complies with the pre-preparation policy may be determined in the following manner: determining, based on the commit type corresponding to the updated code version, whether the commit type corresponding to the updated code version and the first commit type are a same commit type; and if the commit type corresponding to the updated code version and the first commit type are a same commit type, determining that the updated code version complies with the pre-preparation policy.

Following the example in the step A, the code version update notification sent by the code hosting platform includes an identifier of the version 12, information about a code branch in which the version 12 is located, a commit type corresponding to the version 12, and/or information about the updated code file 120 included in the version 12. Whether the commit type corresponding to the version 12 and the first commit type are a same commit type may be determined based on the commit type corresponding to the version 12. If the commit type corresponding to the version 12 and the first commit type are a same commit type, it is determined that the version 12 complies with the foregoing pre-preparation policy. For example, if the first commit type is code result rectification, and the commit type corresponding to the version 12 is also code result rectification, it may be determined that the version 12 complies with the foregoing pre-preparation policy.

In another possible implementation, the pre-preparation policy set by the user includes a first code branch. In this case, whether the updated code version complies with the pre-preparation policy may be determined in the following manner: determining, based on the information about the code branch in which the updated code version is located, whether the code branch in which the updated code version is located and the first code branch are a same code branch; and if the code branch in which the updated code version is located and the first code branch are a same code branch, determining that the updated code version complies with the pre-preparation policy.

Following the example in the step A, the code version update notification sent by the code hosting platform includes the identifier of the version 12, the information about the code branch in which the version 12 is located, the commit type corresponding to the version 12, and/or information about the updated code file 120 included in the version 12. Whether the code branch in which the version 12 is located and the first code branch are a same code branch may be determined based on the information about the code branch in which the version 12 is located. If the code branch in which the version 12 is located and the first code branch are a same code branch, it is determined that the version 12 complies with the pre-preparation policy.

Step C: If the updated code version complies with the pre-preparation policy, download the updated code file included in the updated code version from the code hosting platform to the storage cluster.

In a possible implementation, referring to the foregoing description, the code version update notification sent by the code hosting platform may include the information about the updated code file included in the updated code version. Therefore, a corresponding file may be downloaded from the code hosting platform to the storage cluster based on the information about the updated code file included in the updated code version.

In a possible implementation, the pre-preparation service module may further determine whether code files included in the updated code version stored in the storage cluster are complete in addition to the updated code file. If the code files are incomplete, when downloading the updated code file from the code hosting platform, the pre-preparation service module further needs to download the missing code file to the storage cluster.

In a possible implementation, the method provided in this embodiment may further include: The pre-preparation service module determines, based on the identifier of the updated code version, M code files corresponding to the updated code version, where M is a positive integer; the pre-preparation service module obtains a storage address of code content of each code file in the M code files in the storage cluster; and the pre-preparation service module generates, based on the identifier of the updated code version, the M code files, and the storage address of the code content of each code file in the M code files in the storage cluster, a file tree object corresponding to the updated code version. The file tree object may alternatively be stored in the storage cluster. A file tree object shown in FIG. 5 can be obtained by performing this operation on all updated code versions.

S303: The pre-preparation service module receives a code execution request, and determines, based on the code execution request, a storage address of code content corresponding to the code execution request in the storage cluster.

The following describes an implementation in which the user triggers the code execution request.

The code execution request carries information about at least one code version that the user requests to execute, information about each code version may include an identifier of the code version and description information of the code version, and the description information of the code version may be used to indicate a commit type corresponding to the code version.

In a possible implementation, the user may trigger the code execution request by selecting an option box in FIG. 6. Each option box in FIG. 6 corresponds to two types of information. Information on the left is an identifier of the code version, and information on the right is description information of the code version. In this case, the code version that the user requests to execute is a code version corresponding to the option box selected by the user, and the information about the code version that the user requests to execute includes: information about the code version corresponding to the option box selected by the user. For example, if the user selects a first option box, an identifier of the code version that the user requests to execute is 4358ca2e, and description information of the code version that the user requests to execute is Fix #code result rectification.

In another possible implementation, the user may first select an option box in FIG. 6 to select a code version that the user currently requests to execute, and then trigger a code execution button to trigger the code execution request. Similarly, in this case, the code version that the user requests to execute is a code version corresponding to the option box selected by the user, and the information about the code version that the user requests to execute is information about the code version corresponding to the option box selected by the user.

In a possible implementation, after receiving the code execution request triggered by the user, the pre-preparation service module determines, based on the information about the at least one code version and the file tree object, a storage address of code content corresponding to each code version in the at least one code version. The pre-preparation service module sends, to the executor, the storage address of the code content corresponding to each code version in the at least one code version.

Descriptions are provided below by using examples.

As shown in FIG. 5, it is assumed that a storage cluster stores n file tree objects, including a file tree object 1, a file tree object 2, . . . , and a file tree object n. Each file tree object corresponds to one code version. It is assumed that an identifier of a code version corresponding to the file tree object 1 is 4358ca2e, an identifier of a code version corresponding to the file tree object 2 is 17bfab15, an identifier of a code version corresponding to the file tree object 3 is 1405fe59, an identifier of a code version corresponding to the file tree object 4 is f4d598e2, an identifier of a code version corresponding to the file tree object 5 is 04ad141a, an identifier of a code version corresponding to the file tree object 6 is d32df9a5, and an identifier of a code version corresponding to the file tree object n is version n. After a code execution request triggered by a user is received, it is assumed that the code execution request carries information about two code versions. Based on the information about the two code versions, it may be determined that identifiers of the two code versions are 4358ca2e and f4d598e2. Based on the relationship between the file tree object and the code version, it may be determined that the file tree object corresponding to 4358ca2e is the file tree object 1. Because the code files corresponding to the file tree object 1 include a file 1 and a file 4, it may be determined that 4358ca2e includes the file 1 and the file 4, a storage address of the file 1 is an address 1, and a storage address of the file 4 is an address 4. The file tree object corresponding to f4d598e2 is the file tree object 4. Because the code files corresponding to the file tree object 4 include the file 1 and a file 5, it may be determined that f4d598e2 includes the file 1 and the file 5, a storage address of the file 1 is the address 1, and a storage address of the file 5 is an address 5.

S304: The pre-preparation service module sends the storage address to the executor.

Following the example in step S303, it may be determined, in S303, that storage addresses of code content corresponding to 4358ca2e are the address 1 and the address 4, and storage addresses of code content corresponding to f4d598e2 are the address 1 and the address 5. In this case, the pre-preparation service module sends, to the executor, the address 1 and the address 4 that correspond to 4358ca2e, and the address 1 and the address 5 that correspond to f4d598e2.

S305: The executor obtains the code content based on the received storage address.

S306: The executor executes the obtained code content.

In a possible implementation, after receiving the storage address of the code content corresponding to each code version in the at least one code version, the executor filters out duplicate storage addresses, to determine to-be-read storage addresses, and reads code content from the storage cluster based on the to-be-read storage addresses. For example, storage addresses of the code content corresponding to the version A received by the executor include an address 1 and an address 2, and storage addresses of the code content corresponding to the version B include the address 1 and an address 3. The address 1 is repeated, so that the redundant address 1 is filtered out, to obtain the to-be-read storage addresses, including the address 1, the address 2, and the address 3. Further, the code content is read from the storage cluster based on the three storage addresses. This avoids a problem in the conventional technology that a code file is repeatedly downloaded when execution tasks received by an executor overlap.

According to the code execution method provided in this embodiment, a user is allowed to set a pre-preparation policy. A pre-preparation service module may obtain, in advance based on the pre-preparation policy, a code version that complies with the policy and store the code version in a storage cluster. When the user triggers a code execution request, code content can be directly obtained from the storage cluster. In this way, a problem of low compilation and building completion efficiency caused by a relatively long time occupied by a download action can be avoided. In addition, after receiving a plurality of storage addresses, an executor filters out duplicate storage addresses, to obtain to-be-read storage addresses. Because storage addresses included in the to-be-read storage addresses are different from each other, a problem of repeated reading can be avoided, and this further resolves a problem in the conventional technology that a code file is repeatedly downloaded when execution tasks received by an executor overlap.

FIG. 7 is a schematic diagram of a structure of a code execution apparatus 700 according to this application. As shown in FIG. 7, the code execution apparatus 700 provided in this application includes a pre-preparation service module 701 and an execution module 702. The pre-preparation service module 701 is configured to: obtain a pre-preparation policy set by a user; download, based on the pre-preparation policy, an updated code file included in an updated code version from a code hosting platform to a storage cluster; receive a code execution request, and determine, based on the code execution request, a storage address of code content corresponding to the code execution request in the storage cluster; and send the storage address to an executor. The execution module 702 is configured to: obtain the code content based on the received storage address; and execute the obtained code content.

Optionally, the pre-preparation service module 701 is specifically configured to: receive a code version update notification sent by the code hosting platform; determine, based on the code version update notification and the pre-preparation policy, whether the updated code version complies with the pre-preparation policy; and if the updated code version complies with the pre-preparation policy, download the updated code file included in the updated code version from the code hosting platform to the storage cluster.

Optionally, the pre-preparation policy includes a first commit type. The code version update notification includes a commit type corresponding to the updated code version. The pre-preparation service module 701 is specifically configured to: determine, based on the commit type corresponding to the updated code version, whether the commit type corresponding to the updated code version and the first commit type are a same commit type; and if the commit type corresponding to the updated code version and the first commit type are a same commit type, determine that the updated code version complies with the pre-preparation policy.

Optionally, the pre-preparation policy includes a first code branch. The code version update notification includes information about a code branch in which the updated code version is located. The pre-preparation service module 701 is specifically configured to: determine, based on the information about the code branch in which the updated code version is located, whether the code branch in which the updated code version is located and the first code branch are a same code branch; and if the code branch in which the updated code version is located and the first code branch are a same code branch, determine that the updated code version complies with the pre-preparation policy.

Optionally, the pre-preparation service module 701 is further configured to: determine, based on an identifier of the updated code version, M code files corresponding to the updated code version, where M is a positive integer; obtain a storage address of code content of each code file in the M code files in the storage cluster; and generate, based on the identifier of the updated code version, the M code files, and the storage address of the code content of each code file in the M code files in the storage cluster, a file tree object corresponding to the updated code version.

Optionally, the code execution request carries information about at least one code version that the user requests to execute. The pre-preparation service module 701 is specifically configured to determine, based on the information about the at least one code version and the file tree object, a storage address of code content corresponding to each code version in the at least one code version. Correspondingly, the execution module 702 is specifically configured to: determine to-be-read storage addresses based on the storage address of code content corresponding to each code version in the at least one code version, where storage addresses included in the to-be-read storage addresses are different from each other; and read code content from the storage cluster based on the to-be-read storage addresses.

The foregoing code execution apparatus provided in this application may perform the steps in the foregoing method embodiment. Implementation principles and technical effects are similar, and details are not described herein again.

Figure 8:
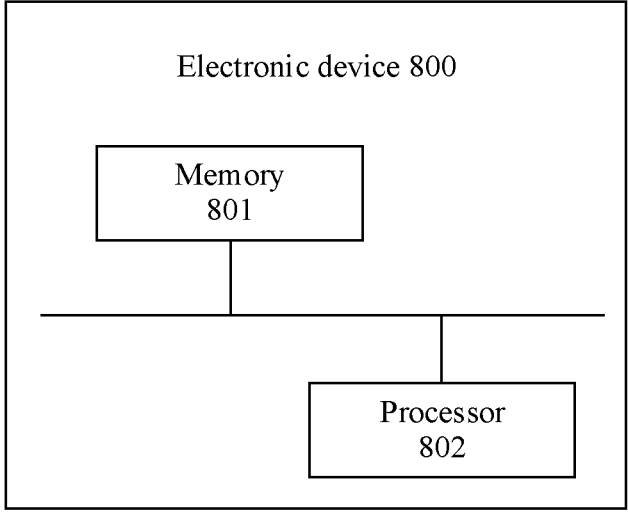
FIG. 8 is a schematic diagram of a hardware structure of an electronic device 800 according to this application.

FIG. 8 is a schematic diagram of a hardware structure of an electronic device 800 according to this application. As shown in FIG. 8, the electronic device 800 includes a memory 801 and at least one processor 802. The memory 801 is configured to store program instructions, and the at least one processor 802 is configured to invoke the program instructions in the memory 801 to perform the steps in the foregoing method embodiment. Implementation principles and technical effects are similar, and details are not described herein again.

This application further provides a readable storage medium. The readable storage medium stores executable instructions. When executing the executable instructions, the at least one processor 802 of the electronic device implements the steps in the foregoing method embodiment. Implementation principles and technical effects are similar, and details are not described herein again.

This application further provides a program product. The program product includes computer programs (namely, executable instructions). The computer programs are stored in a readable storage medium. At least one processor 802 of an electronic device may read the computer program from the readable storage medium, and the at least one processor 802 executes the computer program, so that the electronic device implements the foregoing code execution method.

In the several embodiments provided in this application, it should be understood that the disclosed device and method may be implemented in other manners. For example, the described device embodiment is merely an example. For example, division into modules is merely logical function division. During actual implementation, there may be another division manner. For example, a plurality of modules may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

Modules described as separate parts may or may not be physically separate, and parts displayed as modules may or may not be physical units, may be located in one position, or may be distributed on a plurality of network units. Some or all of the modules may be selected according to actual requirements to achieve the objectives of the solutions in the embodiments of this application.

In addition, functional modules in embodiments of this application may be integrated into one processing unit, or each of the modules may exist alone physically, or two or more modules are integrated into one unit. The unit formed by the modules may be implemented in a form of hardware, or may be implemented in a form of hardware in addition to a software functional unit.

When the foregoing integrated module is implemented in a form of a software functional module, the integrated unit may be stored in a computer-readable storage medium. The software function module is stored in a storage medium and includes several instructions to enable a computer device (which may be a personal computer, a server, or a network device) or a processor to perform some steps of the methods in the embodiments of this application.

It should be understood that the processor may be a central processing unit (CPU), or may be another general-purpose processor, a digital signal processor (DSP), an application-specific integrated circuit (ASIC), or the like. The general-purpose processor may be a microprocessor, or the processor may be any conventional processor or the like. The steps of the methods disclosed with reference to the present disclosure may be directly implemented by a hardware processor, or may be implemented by a combination of hardware and a software module in a processor.

The memory may include a high-speed RAM memory, or may include a non-volatile memory NVM such as at least one magnetic disk memory, or may include a USB flash drive, a removable hard disk, a read-only memory, a magnetic disk, an optical disc, or the like.

The bus may be an industry standard architecture (ISA) bus, a peripheral component interconnect (peripheral component, PCI) bus, an extended industry standard architecture (EISA) bus, or the like. Buses may be classified into an address bus, a data bus, a control bus, and the like. For ease of representation, the bus in the accompanying drawings in this application is not limited to only one bus or only one type of bus.

All or a part of the foregoing embodiments may be implemented by software, hardware, firmware, or any combination thereof. When software is configured to implement the embodiments, the embodiments may be implemented entirely or partially in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital versatile disc (DVD)), a semiconductor medium (for example, a solid state drive (solid state disk, SSD)), or the like.

What is claimed is:

1. A method comprising:

obtaining, by a pre-preparation servicer of a code execution system, a pre-preparation policy set by a user;

receiving, from a code hosting platform, a code version update notification comprising an identifier that identifies an updated code version;

determining, based on the code version update notification and the pre-preparation policy, whether the updated code version complies with the pre-preparation policy;

in response to determining the updated code version complies with the pre-preparation policy, downloading, by the pre-preparation servicer and based on the identifier, one or more updated code files associated with the identifier from the code hosting platform to a storage cluster of the code execution system;

subsequent to downloading the one or more updated code files, receiving, by the pre-preparation servicer, a code execution request;

identifying, based on the identifier, the one or more updated code files associated with the identifier;

obtaining, from the storage cluster, storage addresses of first code content within the one or more updated code files;

generating a file tree object corresponding to the updated code version based on the identifier, the one or more updated code files, and the storage addresses;

determining, by the pre-preparation servicer and based on the code execution request and the file tree object, a storage address of second code content within the one or more updated code files, wherein the first second code content is retrieved from the storage cluster using the storage address;

sending, by the pre-preparation servicer, the storage address to an executor of the code execution system;

obtaining, by the executor and based on the storage address, the second code content; and executing, by the executor, the second code content.

2. The method of claim 1, further comprising receiving the code execution request from the user.

3. The method of claim 1, wherein the pre-preparation policy comprises a first commit type, wherein the code version update notification further comprises a second commit type corresponding to the updated code version, and wherein determining whether the updated code version complies with the pre-preparation policy comprises:

determining whether the second commit type and the first commit type are a same commit type; and determining that the updated code version complies with the pre-preparation policy when the second commit type and the first commit type are the same commit type.

4. The method of claim 1, wherein the pre-preparation policy comprises a first code branch, wherein the code version update notification further comprises information about a second code branch in which the updated code version is located, and wherein determining whether the updated code version complies with the pre-preparation policy comprises:

determining, based on the information, whether the second code branch and the first code branch are a same code branch; and determining that the updated code version complies with the pre-preparation policy when the second code branch and the first code branch are the same code branch.

5. The method of claim 1, wherein the code execution system is a code check system.

6. The method of claim 1, wherein the code execution request carries information about at least one code version that the user requests to execute, wherein determining the storage address comprises determining, based on the information, at least one storage address of corresponding code content that corresponds to each code version in the at least one code version, and wherein obtaining the first second code content comprises:

determining to-be-read storage addresses based on the at least one storage address, wherein each to-be-read storage address of the to-be-read storage addresses is different from each other to-be-read storage address of the to-be-read storage addresses; and reading, based on the to-be-read storage addresses, the corresponding code content from the storage cluster.

7. The method of claim 1, wherein the code execution system is a compilation and building system or a code analysis system.

8. A computer program product comprising instructions that are stored on a non-transitory computer-readable medium and that, when executed by a processor, cause a code execution system to:

obtain, by a pre-preparation servicer of the code execution system, a pre-preparation policy set by a user;

receive, from a code hosting platform, a code version update notification comprising an identifier that identifies an updated code version;

determine, based on the code version update notification and the pre-preparation policy, whether the updated code version complies with the pre-preparation policy;

in response to determining the updated code version complies with the pre-preparation policy, download, by the pre-preparation servicer and based on the identifier, one or more updated code files associated with the identifier from the code hosting platform to a storage cluster of the code execution system;

receive, by the pre-preparation servicer and subsequent to downloading the one or more updated code files, a code execution request, identify, based on the identifier, the one or more updated code files associated with the identifier;

obtain, from the storage cluster, storage addresses of first code content within the one or more updated code files;

generate a file tree object corresponding to the updated code version based on the identifier, the one or more updated code files, and the storage addresses;

determine, by the pre-preparation servicer and based on the code execution request and the file tree object, a storage address of second code content within the one or more updated code files, wherein the second code content is retrieved from the storage cluster using the storage address;

send, by the pre-preparation servicer, the storage address to an executor of the code execution system;

obtain, by the executor, the second code content based on the storage address; and execute, by the executor, the second code content.

9. The computer program product of claim 8, wherein when executed by the processor, the instructions cause the code execution system to download the one or more updated code files by causing the pre-preparation servicer to receive the code execution request from the user.

10. The computer program product of claim 8, wherein the pre-preparation policy comprises a first commit type, wherein the code version update notification further comprises a second commit type corresponding to the updated code version, and wherein when executed by the processor, the instructions cause the code execution system to determine whether the updated code version complies with the pre-preparation policy by causing the pre-preparation servicer to:

determine whether the second commit type and the first commit type are a same commit type; and determine that the updated code version complies with the pre-preparation policy when the second commit type and the first commit type are the same commit type.

11. The computer program product of claim 8, wherein the pre-preparation policy comprises a first code branch, wherein the code version update notification further comprises information about a second code branch in which the updated code version is located, and wherein when executed by the processor, the instructions cause the code execution system to determine whether the updated code version complies with the pre-preparation policy by causing the pre-preparation servicer to:

determine, based on the information, whether the second code branch and the first code branch are a same code branch; and determine that the updated code version complies with the pre-preparation policy when the second code branch and the first code branch are the same code branch.

12. The computer program product of claim 8, wherein the code execution system is a code analysis system.

13. The computer program product of claim 8, wherein the code execution request carries information about at least one code version that the user requests to execute, wherein when executed by the processor, the instructions cause the code execution system to determine the storage address by causing the pre-preparation servicer to determine, based on the information, at least one storage address of corresponding code content that corresponds to each code version in the at least one code version, and wherein when executed by the processor, the instructions cause the code execution system to obtain the second code content by causing the executor to:

determine to-be-read storage addresses based on the at least one storage address, wherein each to-be-read storage address of the to-be-read storage addresses is different from each other to-be-read storage address of the to-be-read storage addresses; and read, based on the to-be-read storage addresses, the corresponding code content from the storage cluster.

14. An electronic device, comprising:

a memory configured to store program instructions; and a processor coupled to the memory and configured to execute the program instructions to implement a code execution system comprising a pre-preparation servicer, a storage cluster, and an executor and to cause the code execution system to:

obtain, by the pre-preparation servicer, a pre-preparation policy set by a user;

receive, from a code hosting platform, a code version update notification comprising an identifier that identifies an updated code version;

determine, based on the code version update notification and the pre-preparation policy, whether the updated code version complies with the pre-preparation policy;

in response to determining the updated code version complies with the pre-preparation policy, download, by the pre-preparation servicer and based on the identifier, one or more updated code files associated with the identifier from the code hosting platform to a storage cluster of the code execution system;

receive, by the pre-preparation servicer and subsequent to downloading the one or more updated code files, a code execution request;

identify, based on the identifier, the one or more updated code files associated with the identifier;

obtain, from the storage cluster, storage addresses of first code content within the one or more updated code files;

generate a file tree object corresponding to the updated code version based on the identifier, the one or more updated code files, and the storage addresses;

determine, by the pre-preparation servicer and based on the code execution request and the file tree object, a storage address of second code content within the one or more updated code files, wherein the second code content is retrieved from the storage cluster using the storage address;

send, by the pre-preparation servicer, the storage address to an executor of the code execution system;

obtain, by the executor, the second code content based on the storage address; and execute, by the executor, the second code content.

15. The electronic device of claim 14, wherein when executed by the processor, the program instructions cause the code execution system to download the one or more updated code files by causing the pre-preparation servicer to receive the code execution request from the user.

16. The electronic device of claim 14, wherein the pre-preparation policy comprises a first commit type, wherein the code version update notification further comprises a second commit type corresponding to the updated code version, and wherein when executed by the processor, the program instructions cause the code execution system to determine whether the updated code version complies with the pre-preparation policy by causing the pre-preparation servicer to:

determine whether the second commit type and the first commit type are a same commit type; and determine that the updated code version complies with the pre-preparation policy when the second commit type and the first commit type are the same commit type.

17. The electronic device of claim 14, wherein the pre-preparation policy comprises a first code branch, wherein the code version update notification further comprises information about a second code branch in which the updated code version is located, and wherein when executed by the processor, the program instructions cause the code execution system to determine whether the updated code version complies with the pre-preparation policy by causing the pre-preparation servicer to:

determine, based on the information, whether the second code branch and the first code branch are a same code branch; and determine that the updated code version complies with the pre-preparation policy when the second code branch and the first code branch are the same code branch.

18. The electronic device of claim 14, wherein the code execution system is a code check system.

19. The electronic device of claim 14, wherein the code execution request carries information about at least one code version that the user requests to execute, wherein when executed by the processor, the program instructions cause the code execution system to determine the storage address by causing the pre-preparation servicer to determine, based on the information, at least one storage address of corresponding code content that corresponds to each code version in the at least one code version, and wherein when executed by the processor, the program instructions cause the code execution system to obtain the first second code content by causing the executor to:

determine to-be-read storage addresses based on the at least one storage address, wherein each to-be-read storage address of the to-be-read storage addresses is different from each other to-be-read storage address of the to-be-read storage addresses; and read, based on the to-be-read storage addresses, the corresponding code content from the storage cluster.

20. The electronic device of claim 14, wherein the code execution system is a compilation and building system.

\* \* \* \* \*